Aug. 28, 1923.
C. J. OYSTER
1,466,381
CONFECTIONERY COATING MACHINE
Filed Sept. 7, 1922
3 Sheets-Sheet 1
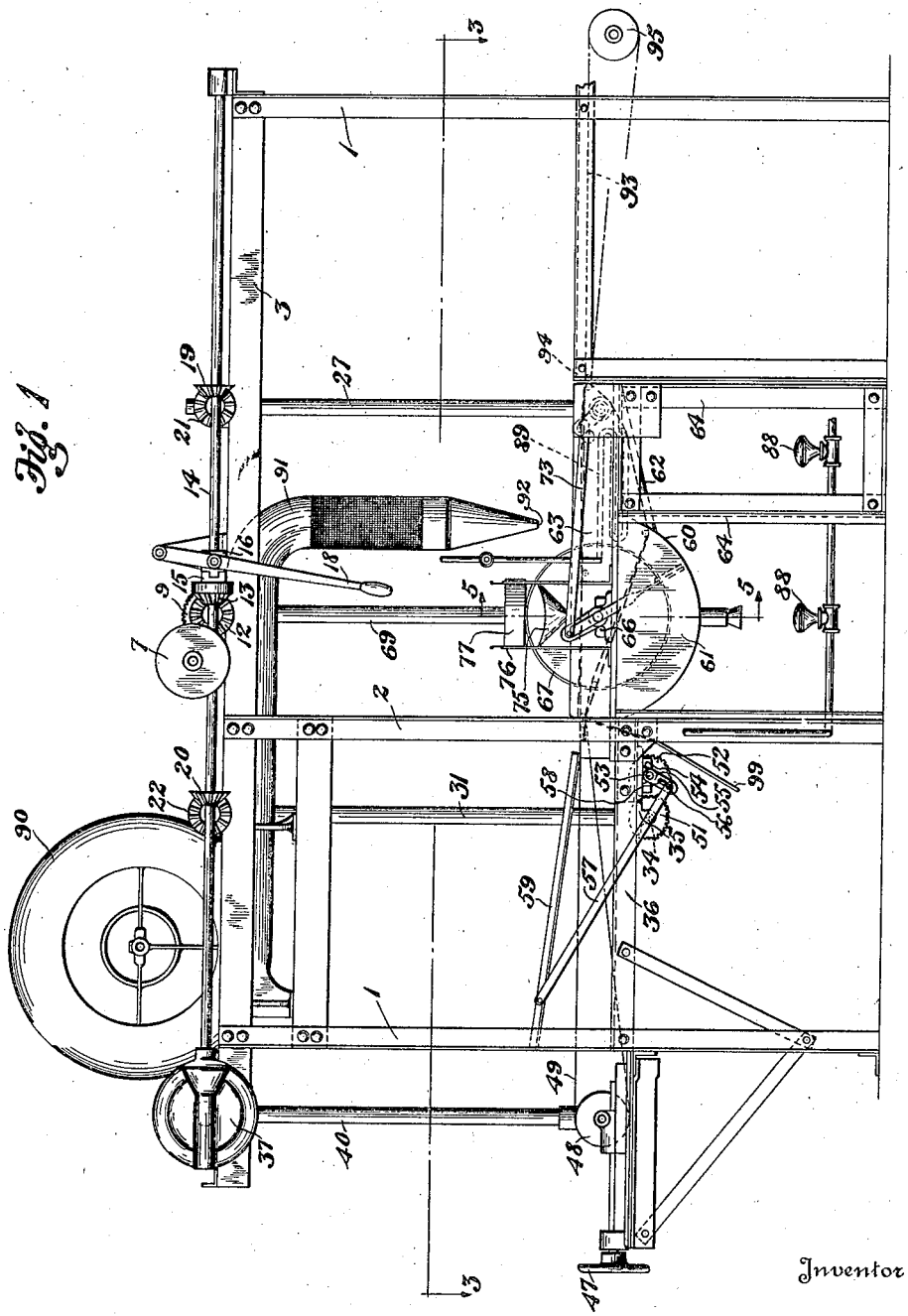
Inventor
C. J. Oyster
By Freau and Bond
Attorneys

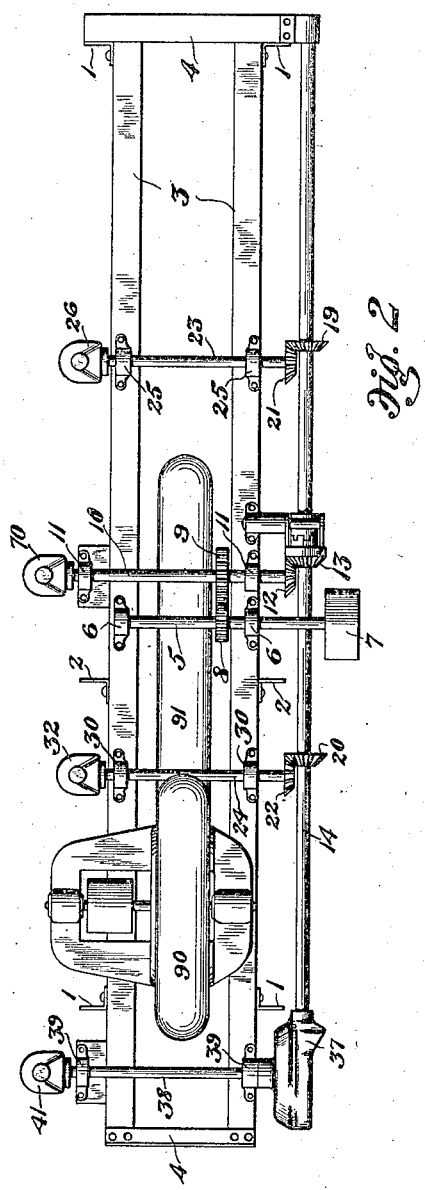
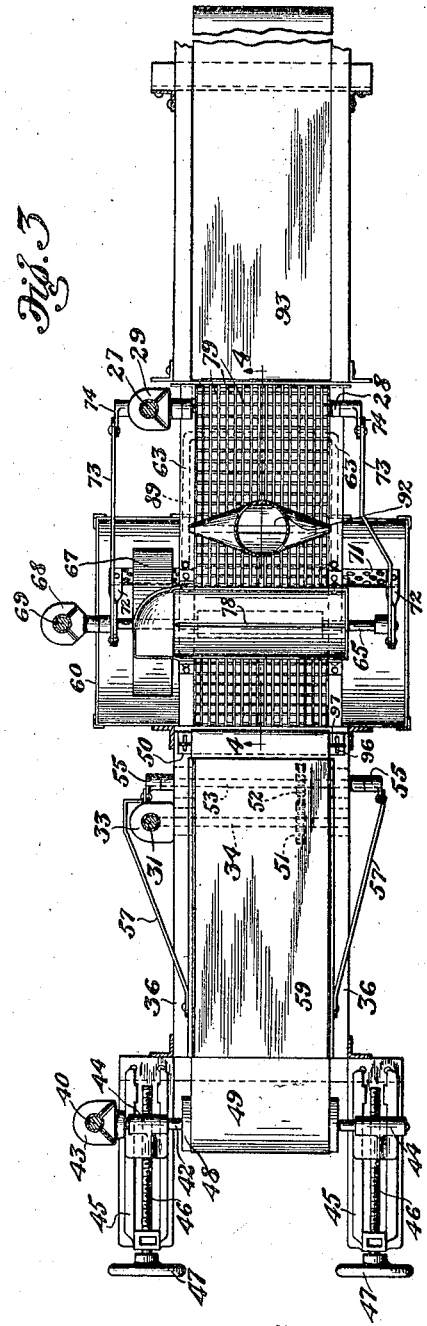

Aug. 28, 1923.

C. J. OYSTER

CONFECTIONERY COATING MACHINE

Filed Sept. 7, 1922

1,466,381

3 Sheets-Sheet 3

Inventor
C. J. Oyster
By Fream and Bond
Attorneys

Patented Aug. 28, 1923.

1,466,381

UNITED STATES PATENT OFFICE.

CLYDE J. OYSTER, OF ALLIANCE, OHIO.

CONFECTIONERY-COATING MACHINE.

Application filed September 7, 1922. Serial No. 586,693.

*To all whom it may concern:*

Be it known that I, CLYDE J. OYSTER, a citizen of the United States, residing at Alliance, in the county of Stark and State of Ohio, have invented a new and useful Confectionery-Coating Machine, of which the following is a specification.

This invention relates to improvements in confectionery coating machines and more particularly to a machine in which the candy is passed beneath a trough containing liquid chocolate or other coating which is sprayed upon the candy as it passes under the trough.

The objects of the invention are to provide a machine of this character in which the liquid coating is carried upward from a tank by means of a wheel or drum, a scraper engaging the upper surface of the drum and removing the liquid coating therefrom, conveying the same to a trough having a slit in its bottom wall through which the liquid coating is sprayed in a sheet upon the candy which is passed beneath said trough by means of a conveyer formed of a plurality of chains, means being provided for removing the surplus coating from the candy and returning the same to the tank, and means being provided for separating alternate chains of the conveyer at certain points to prevent the same from becoming caked with the liquid coating and adhering together, a shaker being provided at the receiving end of the conveyer for properly positioning the candy articles for the passing of the conveyer.

A preferred embodiment of the invention is illustrated in the accompanying drawings, in which—

Figure 4:
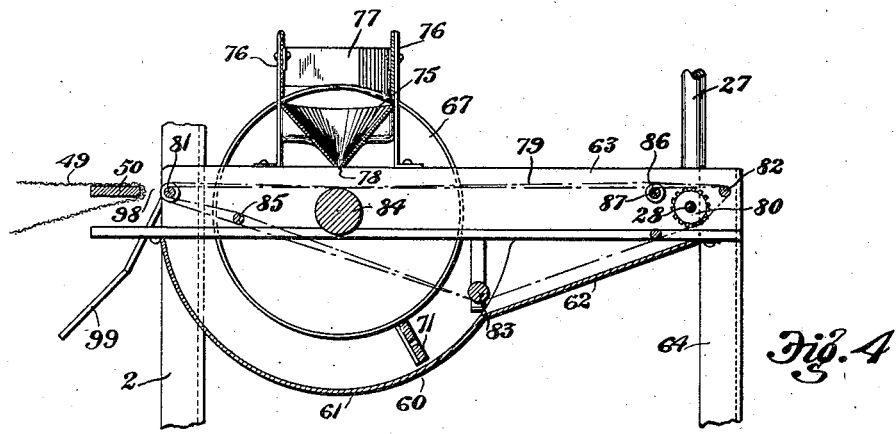
Figure 5:
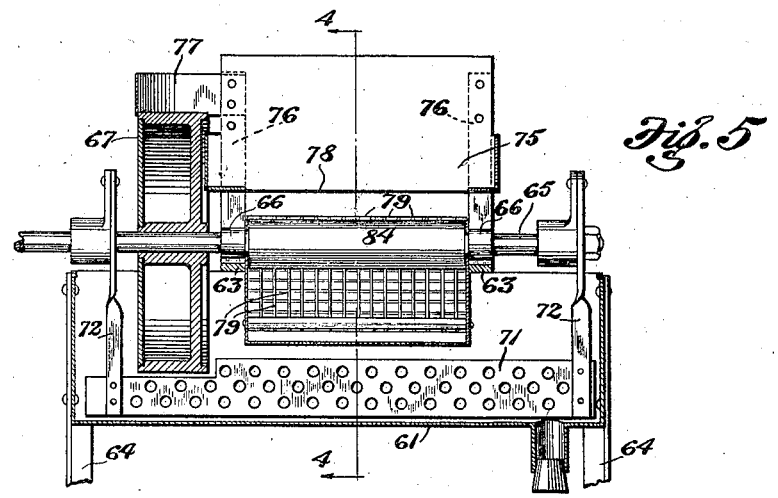

Figure 1 is a side elevation of a confectionery coating machine embodying the invention;

Fig. 2, a top plan view of the same;

Fig. 3, a section on the line 3—3, Fig. 1;

Fig. 4, an enlarged section on the line 4—4, Figs. 3 and 5;

Fig. 5, a section on the line 5—5, Fig. 1; and

Figure 6:
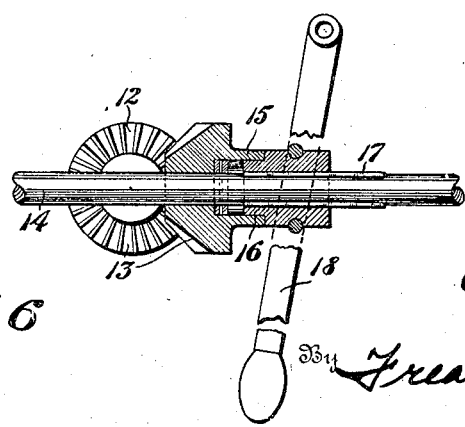

Fig. 6, a detached sectional view of the clutch.

Similar numerals indicate corresponding parts throughout the drawings.

The machine is carried in a frame comprising the corner standards 1 and intermediate standards 2 connected at their upper ends by the longitudinal frame members 3 and the cross members 4. A power shaft 5 is journaled in bearings 6 mounted upon the longitudinal frame members 3 intermediate the extremities thereof and has the pulley 7 fixed thereon from which power may be obtained from any suitable source.

A pinion 8 upon the shaft 5 meshes with a gear 9 upon the countershaft 10 which is journaled in suitable bearings 11 carried by the frame members 3, a bevel gear 12 upon the counter-shaft meshing with a bevel gear 13 rotatably mounted upon the longitudinal shaft 14.

The gear 13 has fixed thereon a clutch member 15 arranged to mesh with the sliding clutch member 16 splined upon the shaft 14 as shown at 17 and arranged to be moved into or out of engagement with the clutch member 15 by means of the shifting lever 18 which is connected in any usual manner to the clutch member 16 to allow rotation thereof.

Bevel pinions 19 and 20 are fixed upon the shaft 14 upon opposite sides of the gear 13 and mesh respectively with bevel pinions 21 and 22 fixed upon the transverse shafts 23 and 24 respectively. A shaft 23 is journaled in bearings 25 upon the frame members 3 and is provided upon its opposite end with the bevel pinion located in the housing 26 and meshing with a similar pinion upon the vertical shaft 27, the lower end of which is geared to the shaft 28 by suitable gearing located in the housing 29.

The shaft 24 is journaled in bearings 30 fixed upon the frame members 3 and is provided at its opposite end with a bevel gear meshing with a similar gear upon the vertical shaft 31, said gearing being enclosed in a housing 32.

The lower end of the shaft 31 is connected by means of gearing located in the housing 33, with the transverse shaft 34 journaled in bearings 35 carried upon the horizontal frame members 36 located between the intermediate standards 2 and the adjacent corner standards of the frame.

A bevel pinion is provided upon one end of the shaft 14 within the housing 37, and meshes with a suitable gear upon the transverse shaft 38 which is journaled in bearings 39 mounted upon the adjacent end portions of the frame members 3, said shaft being geared to the vertical shaft 40 by suitable gearing located in the housing 41, the lower end of the shaft 40 being geared to the conveyer drum shaft 42 by suitable gearing located in the housing 43.

The shaft 42 is journaled in adjustable bearings 44 longitudinally movable in the guide ways 45 and arranged to be adjusted therein by means of the adjusting screws 46, hand wheels 47 being fixed upon said screws for operating the same. The drum 48 is fixed upon the shaft 42 and the conveyer belt 49 is located around said drum and extends forwardly over the bar or plate 50 carried between the standards 2.

A pinion 51 is fixed upon the shaft 34 and meshes with a similar pinion 52 upon the shaker shaft 53, said last named shaft being journaled in bearings 54 upon the frame members 36 and having the slotted arms 55 fixed upon its extremities, pins 56 upon the links 57 engaging the slots 58 of said arms.

The shaker tray 59 is pivotally connected near its rear end to the links 57, the forward end thereof resting upon the conveyer belt 49 and being arranged for longitudinal slidable movement thereon.

A tank 60, provided with a half round portion 61, and a rearwardly inclined portion 62 communicating therewith, is mounted upon the side frame members 63 which are supported between the intermediate standards 2 and the short standards 64.

A shaft 65 is journaled in bearings 66 upon the frame members 63 and has fixed thereon a drum 67 extending into one end portion of the tank 60, said shaft being connected by gearing located in the housing 68 with the vertical shaft 69 which is geared to the countershaft 10 by means of suitable gearing located in the housing 70.

An agitator comprising a perforate blade 71 is carried by a pair of arms 72 rotatably mounted upon the shaft 65 at a point intermediate their extremities, the upper ends of said arms being connected by means of links 73 with the arms 74 fixed upon the shaft 28.

A V-shaped trough 75 is mounted above and spaced from the tank 60 as by the bracket 76 carried upon the side members 63 and is provided with a curved blade 77 extending over the upper edge of the drum 67 for the purpose of removing the liquid chocolate or other coating material from the drum and conveying the same into the trough 75, a slit 78 being provided in the bottom of the trough 75 for the purpose of spraying the candy articles, with the liquid coating, as they are passed beneath the trough.

The conveyer which carries the candy articles to be coated beneath the trough, comprises a plurality of endless chains 79 driven by a sprocket drum 80 and located over the rollers 81 and 82 at the rear and forward ends respectively of the chains and under the roller 83 located through the trough, the chains also extending over a drum 84 mounted upon the shaft 65.

The sprocket drum 80 is mounted upon the driven shaft 28 and rotates all of the chains 79. For the purpose of separating the chains at intervals, in order to prevent any caking of the chocolate coating thereon, alternate chains are run over and under a rod 85 located near the roller 81, and for the same purpose, alternate chains are run over the rollers 86 and rod 87, thus moving the alternate chains of the conveyer through different planes at intervals to assure the separation of the chains, and the breaking up of any liquid coating which might otherwise become hardened or caked upon the chains.

For the purpose of keeping the chocolate coating in liquid state of suitable consistency, gas burners or the like 88 may be provided beneath the tank and steam coils 89 may be located within the tank as shown in Fig. 1.

For the purpose of removing any surplus coating from the candy articles as well as to assist in removing the coating from the chained conveyer, a blower indicated generally at 90 may be supported above the frame and connected to the pipe 91 which extends downward over the chain conveyer at a point beyond the trough 75, terminating in an elongated restricted nozzle 92.

A delivery conveyer or apron 93 is preferably located at the delivery end of the chain conveyer extending over the rollers 94 and 95, one of which may be driven in any suitable manner in order to convey the coated candy articles away from the chain conveyer.

Attention is directed to the fact that the plate 50 over which the forward end of the delivery belt or apron 49 is located, is provided with slots 96 through which the adjusting screws 97 are located. By this construction, the space shown at 98, between the delivery apron 49 and the chain conveyer 79 may be varied.

The object of providing this space between the two conveyers is to allow small articles such as peanuts which may become loosened from peanut clusters, from passing on to the chain conveyers and dropping into the tank containing the liquid chocolate. In order to carry articles of this kind away, a chute 99 is located beneath the opening 98.

Attention is directed to the drum 84 mounted upon the shaft 65 and located directly beneath the trough 75, the chain conveyer passing over said drum and carrying the articles to be coated. It will be seen that considerable of the chocolate coating from the trough will be deposited upon said drum and as the same continuously revolves beneath the chain conveyer, the under sides of the candy articles will be coated with chocolate as they pass over the drum.

From the above and the accompanying drawings, it will be evident that a machine is provided for coating candy articles with chocolate or the like in which means is provided for placing the candy articles in proper position before they are passed to the chain conveyer, the liquid coating is kept in the proper state, continuously mixed by the agitator. The chain conveyer is operated to prevent the same from becoming caked or clogged with the liquid coating, the surplus coating being removed from the articles before they pass off of the chain conveyer and means are provided for conveying peanuts or similar small, loose articles away from the chain conveyer to prevent their dropping into the tank of liquid coating.

I claim:

1. A confectionery coating machine including a tank, a trough spaced above the tank and having a perforate bottom, means for raising liquid coating material from the tank and depositing the same in the trough, a conveyer composed of a plurality of separate chains and arranged to carry articles to be coated beneath the trough and means for moving certain of the chains through a different plane from the remaining chains.

2. A confectionery coating machine including a tank, a trough spaced above the tank and having a perforate bottom, means for raising liquid coating material from the tank and depositing the same in the trough, a conveyer composed of a plurality of separate chains and arranged to carry articles to be coated beneath the trough and means for moving alternate chains through a different plane from the remaining chains.

3. A confectionery coating machine including a tank, a trough spaced above the tank and having a perforate bottom, means for raising liquid coating material from the tank and depositing the same in the trough, a conveyer composed of a plurality of separate chains and arranged to carry articles to be coated beneath the trough, and a rod located in the path of the chains, certain of the chains passing over the rod and the remaining chains passing under the rod.

4. A confectionery coating machine including a tank, a trough spaced above the tank and having a perforate bottom, means for raising liquid coating material from the tank and depositing the same in the trough, a conveyer composed of a plurality of separate chains and arranged to carry articles to be coated beneath the trough, and a rod located in the path of the chains, alternate chains passing upon opposite sides of the rod.

CLYDE J. OYSTER.